United States Patent [19]

Urich

[11] Patent Number: 5,150,614
[45] Date of Patent: Sep. 29, 1992

[54] LIQUID LEVEL SENSING DEVICE

[76] Inventor: Manfred Urich, Anton-Bruckner-Strasse 3, D-6390 Usingen, Fed. Rep. of Germany

[21] Appl. No.: 719,733

[22] Filed: Jun. 25, 1991

[30] Foreign Application Priority Data

Jun. 28, 1990 [DE] Fed. Rep. of Germany ....... 9007189
Dec. 29, 1990 [DE] Fed. Rep. of Germany ....... 4042235

[51] Int. Cl.$^5$ .................... H01H 5/02; G01F 23/36
[52] U.S. Cl. ................................... 73/308; 73/313; 335/219
[58] Field of Search .............. 73/308, 309; 335/219

[56] References Cited

U.S. PATENT DOCUMENTS

| | | | |
|---|---|---|---|
| 3,153,932 | 10/1964 | Johnson et al. | 73/309 |
| 3,823,328 | 7/1974 | Barton et al. | 73/308 X |
| 4,321,590 | 3/1982 | Ishikawa et al. | |
| 4,442,405 | 4/1984 | Andrejasich et al. | 73/308 |
| 4,821,022 | 4/1989 | Jannotta | |
| 5,035,512 | 7/1991 | Tateishi et al. | 73/308 X |

FOREIGN PATENT DOCUMENTS

| | | |
|---|---|---|
| 2228303 | 1/1973 | Fed. Rep. of Germany . |
| 1801739 | 3/1974 | Fed. Rep. of Germany . |
| 2259555 | 6/1974 | Fed. Rep. of Germany . |
| 2929941 | 3/1981 | Fed. Rep. of Germany . |
| 3217474 | 11/1983 | Fed. Rep. of Germany . |
| 3527423 | 2/1987 | Fed. Rep. of Germany . |
| 3600386 | 7/1987 | Fed. Rep. of Germany . |

Primary Examiner—Daniel M. Yasich
Attorney, Agent, or Firm—Armstrong, Nikaido, Marmelstein, Kubovcik & Murray

[57] ABSTRACT

The invention is directed to a liquid level sensing device having a float (4) configured as a hollow body and slidably mounted on a slide tube (3) for the actuation of reed-type switches (11) provided in the interior of the slide tube (3). In order to perform a check for proper functioning, the float (4) is movable independently of the filling level into a signalling position by an electromagnetic actuation device (15). The hollow space (7) of the float (4) contains a gas pressurized to above or below atmospheric and is connected via a flexible tube (12) to a pressure monitoring device (13) which responds whenever the gas pressure deviates from a predetermined value.

13 Claims, 2 Drawing Sheets

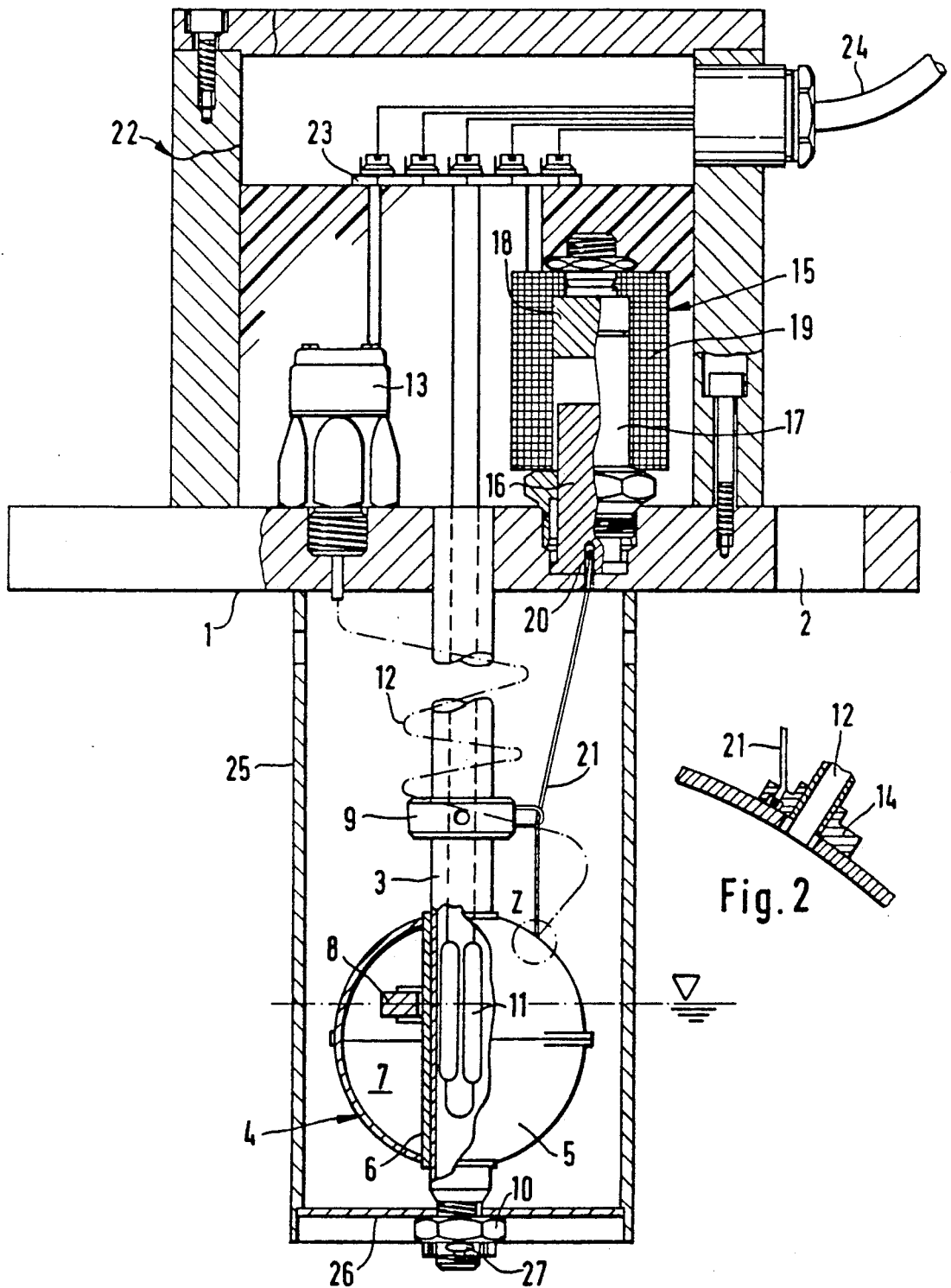

LIQUID LEVEL SENSING DEVICE

This invention relates to a liquid level sensing device, in particular for liquid tanks, with a movably mounted float which includes a permanent magnet and is mounted on a slide tube fabricated of a nonmagnetic material, the slide tube being arranged on a plate or a threaded fitting for closing an opening of a tank and accommodating a switching device which is actuatable in non-contact fashion by magnetic force.

A liquid level sensing device of the type referred to is known from DE-A-3 632 739. Liquid level sensing devices of this type are used for continually sensing the liquid level or as a safeguard against spills to monitor a predetermined liquid level limit value, for example, a maximum filling level, in a container or tank. In numerous applications, high demands are made on the reliability of liquid level sensing devices for reasons of safety. To satisfy these high demands, a check for correct functioning of liquid level sensing devices is necessary.

From DE-AS 1 801 739 an arrangement for checking the function of a float-controlled liquid level indicating device is already known in which a test magnet is slidably mounted in the longitudinal direction of a protective tube of non-magnetizable material. The protective tube accommodates a switching magnet which is connected to the float of the liquid level indicator by means of a vertical rod and operates magnetically to actuate switches disposed outside the protective tube at the levels subject to monitoring. The test magnet is arranged adjacent to the switching magnet such that its vertical adjustment range includes that of the switching magnet, and its field strength is dimensioned such that its displacement, whilst having no effect on the switches, magnetically attracts the switching magnet, causing it to follow its movement along the range to be checked while operating on the switches. This makes it possible to check from outside whether the float as well as the switching magnet are free to follow the fluctuations of the liquid level, without lowering of the liquid level occurring. This known checking arrangement is not suitable for utilization in a liquid level sensing device of the type initially referred to.

It is an object of the present invention to enable a check for correct functioning to be made in a liquid level sensing device of the foregoing character using simple means.

According to the present invention, this object is accomplished in that the float is movable independently of the liquid level by a magnetic actuation device into a position in which the switching device is actuated, that the actuation device includes an armature which is connected to the float by a means not impairing the freedom of movement of the float due to buoyancy and which is arranged in a sleeve of nonmagnetic material connected tight with the plate or the threaded fitting and closed relative to the outside.

The present invention enables the float to be moved into a switching position without requiring the presence of a liquid level suitable for raising the float. In this arrangement, it is possible both to check the float for sufficient freedom of movement in its mounting and to check the signal generator and the signal transmission for proper response. In this manner, a complete performance check of the liquid level sensing device is accomplished. The use of an encapsulated armature assures an explosion-proof and hermetically sealed enclosure as required for many applications, in addition to allowing accurate metering of the actuation force suited for checking for sufficient freedom of movement. The sleeve enables the liquid level sensing device to be sealed gas-tight as required, for example, in the storage of explosive or environmentally hazardous media.

According to the invention, the actuation force of the actuation device may be dimensioned such that it does not exceed, or exceeds only slightly, the minimum buoyant force necessary for movement of the float. Accordingly, if movement of the float is restricted due to crystallization, incrustation or corrosion, this condition can be detected at a time when the float is still movable and operative with increased buoyancy.

According to the invention, the actuation device may be configured such as to be accessible from outside and actuatable by hand. Preferably, however, the actuation device is provided with a remotely controllable operating mechanism in order to be able to execute a performance check from a central control station by activating the actuation device.

In accordance with a preferred embodiment of the invention, the float may be connected to the armature by a flexible rope or a chain, or alternatively, a rod may be provided on the armature and extend through an eye on the float, the rod having at its end a safety catch for the eye.

In accordance with a further proposal of the invention, the armature may be connected to the float also by means of a spring (FIG. 4) which is tensioned by an actuation of the armature until the predetermined motional force acts on the float. By suitably dimensioning the spring, the force for moving the float is capable of being metered in the desired manner. According to the invention, further provisions may include biasing of the spring by the weight of the float when not submerged, the spring thereby compensating for part of the float weight. Therefore, the float may be a smaller or heavier structure.

Actuation of the armature may be accomplished mechanically by manual, electric, pneumatic or hydraulic means. In combination with a remote control, particularly an electromagnetic or pneumatic actuation of the armature may be considered. To actuate the armature, according to the invention a permanent magnet actuatable manually, hydraulically or pneumatically may be seatable on the sleeve from outside, or a remotely controllable magnetic coil may be disposed on the sleeve.

The invention further provides means suited to monitoring the floating function of the float of the liquid level sensing device. This may be necessary if the float is a hollow body and if, on account of the media acting on the float, the risk exists that the float develops a leak due to corrosion. In order to enable the floating function to be checked in the use of a hollow float, the invention provides for the hollow space of the float to contain a gas pressurized to above or below atmospheric and to be connected to a pressure monitoring device via a flexible tube, the monitoring device producing a signal whenever the gas pressure deviates from a predetermined value. If the hollow body of the float develops a leak, a signal indicating the defective condition of the liquid level sensing device will be generated. According to the invention, the pressure monitoring device may include a pressure-operated switch which operates on a monitoring circuit.

In accordance with a further proposal of the invention, the flexible tube may be configured as a spring compensating for part of the float weight and/or being connected to the armature. Such a multiple function of the flexible tube simplifies the structure of the liquid level sensing device, increasing its reliability. Moreover, the flexible tube may be spaced from and surround the slide tube in the form of a helix, with the hollow float being guided axially on the slide tube.

An embodiment of the invention will now be described in more detail in the following with reference to the accompanying drawings. In the drawings, FIG. 1 is a partial sectional view of a liquid level sensing device of the invention including a corrosion and function checking means;

FIG. 2 is an enlarged sectional view of the area Z of the float of FIG. 1;

Figure 3:
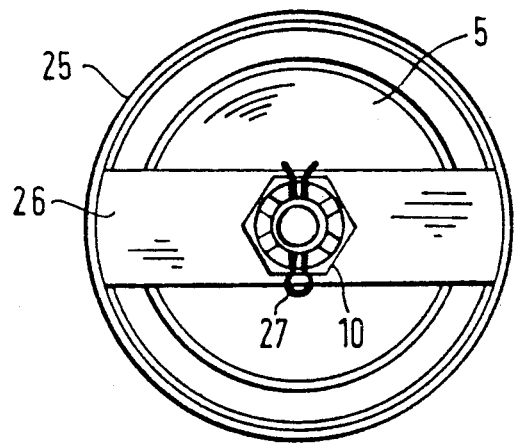
FIG. 3 is an cross sectional view of a bottom end of the liquid level sensing device of FIG. 1.
Figure 4:
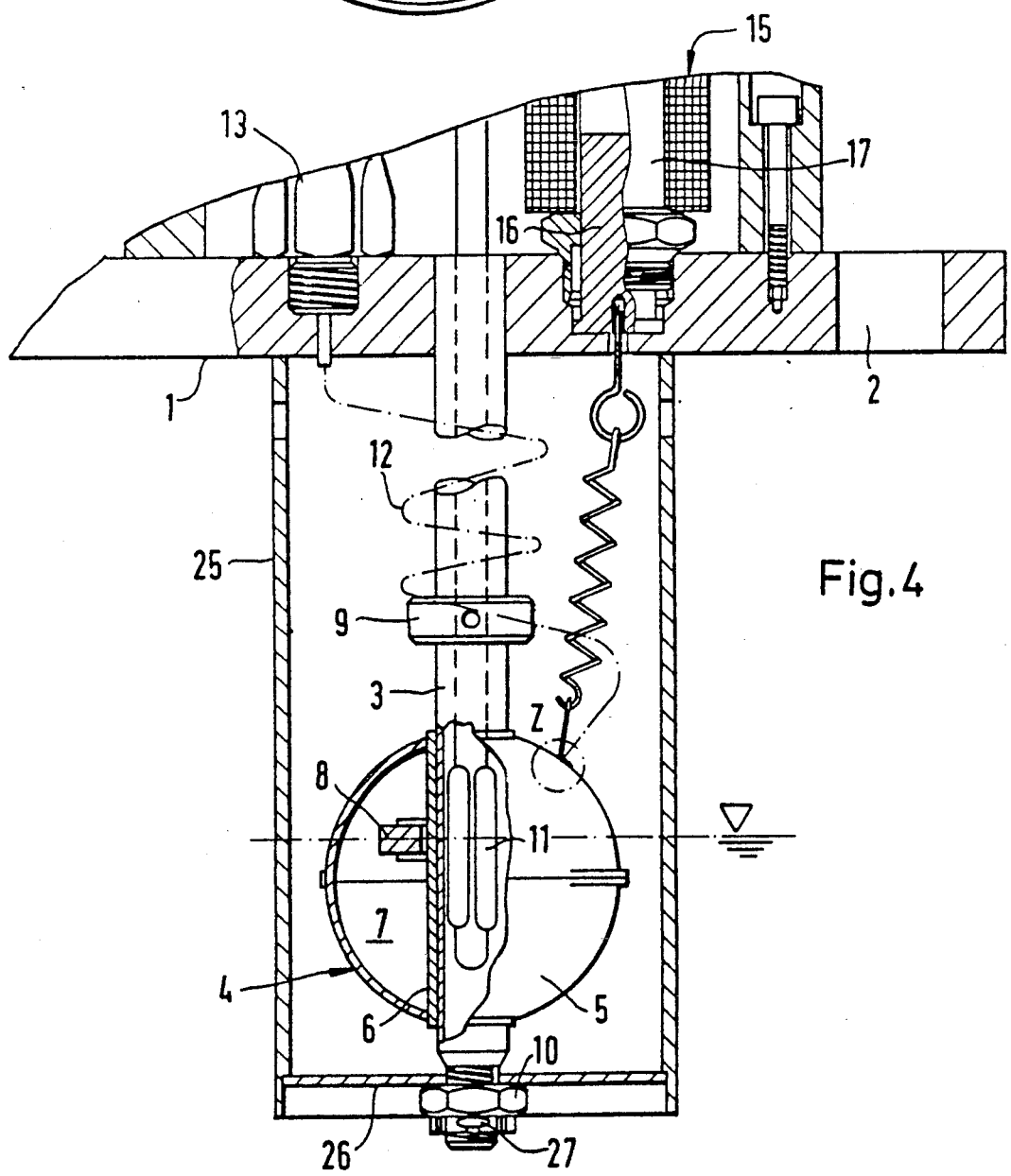
FIG. 4 is a partial sectional view of another embodiment of the liquid level sensing device of the invention.

The liquid level sensing device illustrated in the drawings is configured as an overflow protection device for a tank on a tank farm. It is comprised of a plate 1 of circular-disk shape which is adapted to close an opening, for example, in the cover of a tank. The plate 1 has on its edge several bores 2 through which screws are passed for fastening. On its underside facing the interior of the tank, a slide tube 3 of nonmagnetic material is mounted on the plate 1 vertically to its surface, the slide tube being secured tight in a central passage bore of the plate 1. The slide tube 3 has its bottom end sealed, its top end on the upper side of the plate 1 being open.

Axially slidably mounted on the slide tube 3 is a float 4. The float 4 is comprised of a hollow sphere 5 having extending centrally therethrough a cylindrical sleeve 6 surrounding the slide tube 3 with radial clearance. Alternatively, the hollow sphere or an elongated float may also be arranged adjacent to the slide tube and be guided thereat. The hollow sphere 5 and the cylindrical sleeve 6 are interconnected in a gas-tight relation to each other, thus enclosing a cylindrical hollow space 7 which determines the buoyancy of the float 4. The hollow space 7 accommodates an annular permanent magnet 8 which embraces the cylindrical sleeve 6 and is magnetized. The cylindrical sleeve 6 and, where applicable, also the hollow sphere 5 are fabricated of a nonmagnetic material, for example, a nonmagnetic corrosion-resistant steel or plastics material. The float 4 is arranged between a stop ring 9 attached to the slide tube 3 by means of a clamping screw, and a nut 10. In the interior of the slide tube 3 are two magnetically actuatable reed-type switches 11 connected together in electrical series in a monitoring circuit. In the position of the float 4 shown in the drawing, the reed-type switches 11 are held in their closed positions by the permanent magnet 8. The monitoring circuit is closed. This makes it possible to indicate that the maximum filling level in the tank is not exceeded yet.

In order to be able to monitor the tightness of the hollow space 7 of the float 4, the hollow space 7 is connected to a pressure switch 13 disposed on the upper side of the plate 1 by means of a flexible tube 12 of small cross section. The flexible tube 12 is wound about the slide tube 3 in the form of a helix- several times at a relative spacing and is biased in the manner of a tension spring, as a result of which it does not oppose the movement of the float 4, rather supporting the buoyant force which acts on the float. The tube 12 is fastened to the float 4 by means of a flange ring 14. The hollow space 7 is filled with a gas pressurized to above or below atmospheric which acts, via the tube 12, upon a diaphragm in the pressure switch 13, keeping the switching means of the pressure switch 13 closed. The pressure switch 13 may be connected to a separate monitoring circuit or it may be connected in the monitoring circuit for overflow protection in series with the reed-type switches 11. If the hollow space 7 of the float 4 develops a leak due to corrosion, for example, the gas will escape and the pressure above atmospheric in the hollow space 7 will drop to the ambient pressure level. This causes the pressure switch 13 to open, opening the monitoring circuit.

To check its function, the liquid level sensing device described is provided with a remotely controllable actuation device 15. The actuation device 15 is comprised of an armature 16 arranged in a sleeve 17 which is threaded from outside into a tapped hole in the plate 1. The free end of the sleeve 17 is sealed by a plug 18. Seated down on the sleeve 17 is a magnetic coil 19 which is held in axial direction by a nut threadedly engaged with the plug 18. An end 20 of a rope 21 made of corrosion-resistant wire is fastened to the armature 16. The rope 21 is fed through a bore in the underside of the plate 1, having at its end 20 a ball which is pressed into a bore in the armature 16. The other end of the rope 21 is connected to the flange ring 14 of the float 4. Between the plate 1 and the float 4, the rope 21 is guided in an eye on the stop ring 9. The guided rope 21 causes the float 4 to be maintained in the position shown in the drawing, preventing it from rotation relative to the slide tube 3. In this arrangement, the armature 16 takes support upon the plate 1. An accurate adjustment of the position of the float 4 relative to the reed-type switches 11 can be accomplished by changing the axial position of the stop ring 9 on the slide tube 3.

With the actuation device 15 described, the float 4 may be operated independently of the filling level to check the function of the liquid level sensing device. This may be accomplished, for example, from a control station exciting the coil 19 by connecting it to a source of voltage, causing the armature 16 to be pulled up and moved until it abuts with the plug 18. This causes the float 4 to be raised by the rope 21, as a result of which the permanent magnet 8 moves away from the reed-type switches 11 until these open automatically. From the resulting opening of the monitoring circuit it can be concluded that the liquid level sensing device operates properly, that is, opening of the monitoring circuit would be achievable also in the presence of a filling level corresponding to the float position obtained by means of the actuation device. For this conclusion to apply, the lifting force of the actuation device 15 must not exceed the minimum buoyant force utilized for raising the float 4 and determined by the weight of the float 4 and the friction of the float guide, minus the bias of the tube 12. If movement of the float 4 is impeded, for example, by deposits, incrustation, crystallization or other adverse factors, making its movement impossible under buoyant force, the actuation device 15 would not be capable of raising the float 4 either due to its dimensioning. Although the coil 19 is excited, the monitoring circuit would therefore remain closed, making it apparent that a malfunction of the liquid level sensing device has occurred. Should the float 4 remain stuck on the slide tube 3 after being raised by the actuation device 15 and fail to return to its normal position, this is equally indicated by the open condition of the monitoring circuit, since this circuit is required to be closed again after de-excitation of the coil 19. Also, a broken condition of the rope 21 will be established in the liquid level sensing device described because, if such a rupture occurs, the float 4 will slide downwards from the position shown until abutment with the nut 10, thereby causing the reed-type switches 11 to open.

The pressure switch 13 and the actuation device 15 are arranged in a housing 22 mounted on the plate 1. For an application in an explosion-proof environment, the bottom part of the housing 22 is filled with an insulating plastic material enclosing the pressure switch 13 and the actuation device 15 completely. The top part of the housing 22 receives a terminal board 23 connecting the pressure switch 13, the coil 19 and the reed-type switches 11 to a cable 24 leading to a control station. Provided on the underside of the plate 1 is a submersible tube 25 spaced from and surrounding the slide tube 3 with the float 4 and protecting them against damage. The submersible tube 25 is held by a sheet-metal bar 26 resting on the nut 10. The nut is secured by a cotter pin 27.

I claim:

1. A liquid level sensing device for a liquid tank, with a movably mounted float (4) which includes a permanent magnet (8) and is mounted on a slide tube (3) fabricated of a nonmagnetic material, said slide tube being arranged on a plate (1) in a manner closing an opening of a tank and said device being provided with a switching device (11) which is actuatable in non-contact fashion by magnetic force, the improvement comprising a float (4) movable independently of a liquid level in the tank by a magnetic actuation device (15) into a position in which the switching device is actuated, the actuation device (15) including an armature (16) which is connected to the float (4) by a means (21) providing freedom of movement of the float (4) due to buoyancy and which armature is slidably mounted in a sleeve (17) of nonmagnetic material connected tight with the plate (1) and closed relative to the outside.

2. The liquid level sensing device as claimed in claim 1, characterized in that the actuation force of the actuation device (15) does not substantially exceed, the minimum buoyant force necessary for movement of the float (4).

3. The liquid level sensing device with a float (4) configured as a hollow body as claimed in claim 1, characterized in that the hollow space (7) of the float (4) contains a gas pressurized to above or below atmospheric and is connected to a pressure monitoring device (13) via a flexible tube (12), said monitoring device responding whenever the gas pressure deviates from a predetermined value.

4. The liquid level sensing device as claimed in claim 1 or claim 2, characterized in that the actuation device (15) is provided with a remotely controllable operating mechanism.

5. The liquid level sensing device as claimed in claim 1 or claim 2, characterized in that the armature (16) is actuatable by a permanent magnet adapted to be seated on the sleeve (17).

6. The liquid level sensing device as claimed in claim 1 or claim 2, characterized in that the armature (16) is actuatable by a remotely controlled magnetic coil (19).

7. The liquid level sensing device as claimed in claim 1 or claim 2, characterized in that the armature (16) is connected to the float (4) by means of a rope (21).

8. The liquid level sensing device as claimed in claim 1 or claim 2, characterized in that the armature (16) is connected to the float (4) by means of a spring.

9. The liquid level sensing device as claimed in claim 8, characterized in that the spring is biased by the weight of the float (4) when not submerged.

10. The liquid level sensing device as claimed in claim 3, characterized in that the flexible tube (12) is configured as a spring.

11. The liquid level sensing device as claimed in claim 3 or claim 10, characterized in that the flexible tube (12) is spaced from and surrounds the slide tube (3) in the form of a helix.

12. The liquid level sensing device as claimed in claim 3 or claim 10, characterized in that the flexible tube (12) is biased by the weight of the float.

13. The liquid level sensing device as claimed in claim 3 or claim 10, characterized in that the flexible tube (12) is secured to the armature (16).

* * * * *